(12) United States Patent
Melnikov et al.

(10) Patent No.: US 11,636,187 B2
(45) Date of Patent: Apr. 25, 2023

(54) SYSTEMS AND METHODS FOR CONTINUOUS USER AUTHENTICATION

(71) Applicant: Acronis International GmbH, Schaffhausen (CH)

(72) Inventors: Oleg Melnikov, Kirkand, WA (US); Alexander Tormasov, Moscow (RU); Serguei Beloussov, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 135 days.

(21) Appl. No.: 16/716,595

(22) Filed: Dec. 17, 2019

(65) Prior Publication Data

US 2021/0182370 A1 Jun. 17, 2021

(51) Int. Cl.
| | |
|---|---|
| *G06F 21/31* | (2013.01) |
| *G06N 20/00* | (2019.01) |
| *G06F 21/32* | (2013.01) |
| *H04L 9/40* | (2022.01) |

(52) U.S. Cl.
CPC ............ *G06F 21/316* (2013.01); *G06F 21/32* (2013.01); *G06N 20/00* (2019.01); *H04L 63/08* (2013.01); *G06F 2221/2139* (2013.01); *G06F 2221/2151* (2013.01)

(58) Field of Classification Search
CPC .................. G06F 21/316; G06F 21/32; G06F 2221/2139; G06F 2221/2151; G06F 21/31; G06N 20/00; H04L 63/08; H04L 63/0861; H04W 12/065
See application file for complete search history.

(56) References Cited

U.S. PATENT DOCUMENTS

| | | | | |
|---|---|---|---|---|
| 2014/0282868 A1* | 9/2014 | Sheller | .................... | G06F 21/31 726/3 |
| 2016/0006730 A1* | 1/2016 | Chari | ....................... | G06F 21/32 726/7 |
| 2018/0239883 A1* | 8/2018 | Gordon | .................... | G06F 21/32 |
| 2018/0260548 A1* | 9/2018 | Labrique | ................. | G06F 21/34 |
| 2020/0320181 A1* | 10/2020 | Deutschmann | ......... | G06F 21/32 |

* cited by examiner

*Primary Examiner* — Jeffrey D. Popham
(74) *Attorney, Agent, or Firm* — ArentFox Schiff LLP; Michael Fainberg

(57) ABSTRACT

Disclosed herein are systems and methods for continuous user authentication during access of a digital service. In an exemplary aspect, a continuous authentication module may receive, at a computing device, initial authentication credentials of the user. The initial authentication credentials enable access to a service via the computing device. While the service is being accessed, the continuous authentication module may continuously monitor whether an unauthorized user has replaced the user in accessing the service by comparing usage attributes of the service with historic usage attributes associated with the user. In response to determining that the unauthorized user has replaced the user, the continuous authentication module may cease the access to the service via the computing device.

18 Claims, 5 Drawing Sheets

SYSTEMS AND METHODS FOR CONTINUOUS USER AUTHENTICATION

FIELD OF TECHNOLOGY

The present disclosure relates to the field of data security, and, more specifically, to systems and methods for continuous user authentication.

BACKGROUND

In modern digital services, the initial and often only authentication of the user occurs during a login phase. The login phase typically involves receiving a username and password, and determining whether the received values correspond to an authentic username and password initially set by the user/service. However, the username and password of the user can easily be stolen. Because no additional authentication is performed subsequent to login, all an intruder has to do is use a stolen username and password to gain complete uninterrupted access. Even if the user provides the initial username and password, the user may stop using a service but forget to logout. This enables an intruder to continue accessing the service using the user's credentials.

Because the initial authentication has been performed at the login phase, the intruder may continue to use a service without the user's knowledge. This is particularly worrisome for exceptionally private services involving the user's medical records, finances, etc. A need to non-invasively authenticate the user after login thus exists. In some approaches, a service may use periodic password re-entries or timeouts (e.g., automatically logging out after a set time), but these approaches are not connected with whether an authorized user is in fact still accessing a service or has been replaced by an unauthorized user.

SUMMARY

To overcome these shortcomings, the present disclosure describes systems and methods for continuously authenticating a user during access of a digital service (used interchangeably with "service"). The continuous authentication described herein is non-invasive (i.e., does not require that a user provide additional passwords or verification codes for authorization purposes) and is based on the user's characteristics and interaction with the service.

In an exemplary aspect, a continuous authentication module may receive, at a computing device, initial authentication credentials of the user. The initial authentication credentials enable access to a service via the computing device. While the service is being accessed, the continuous authentication module may continuously determine whether an unauthorized user has replaced the user in accessing the service by receiving a plurality of data streams capturing usage attributes of the service, wherein each data stream of the plurality of data streams is of a different data type, and comparing the usage attributes with historic usage attributes associated with the user. The continuous authentication module may detect a discrepancy between the usage attributes and the historic usage attributes. The discrepancy may indicate that an unauthorized user has replaced the user (e.g., before or after the access began). In response to determining that the unauthorized user has replaced the user, the continuous authentication module may cease the access to the service via the computing device.

In some aspects, the plurality of data streams comprises at least two of: an audio data stream, a visual data stream, a biometrics data stream, and an input/output (I/O) command data stream.

In some aspects, the continuous authentication module may identify all possible usage attributes that can be extracted from the plurality of data streams. The continuous authentication module may determine, based on the service, a combination of usage attributes from the plurality of data streams that increase a likelihood of detecting the discrepancy without false positives. The continuous authentication module may then parse each of the plurality of data streams to extract the combination of usage attributes (where the usage attributes being compared to the historic usage attributes as mentioned above are the combination of usage attributes).

In some aspects, the continuous authentication module may determine the combination of usage attributes by identifying a user option for interacting with the service and identifying, from a database of option characteristics, potential usage attributes that can be used to monitor the user option based on hardware capabilities of the computing device. The continuous authentication module accordingly may determine the combination of usage attributes based on the potential usage attributes listed in the database.

In some aspects, the continuous authentication module may adjust the combination of usage attributes to include and remove select usage attributes in response to detecting a selection of a different user option.

In some aspects, the service is an email application and the user option is drafting an email. The continuous authentication module may detect that the user option of drafting the email is being utilized and determine, based on the database of option characteristics, that the combination of usage attributes comprises at least one of: (1) user fingerprints during typing, (2) speed of typing, and (3) linguistics of text in the email. The continuous authentication module may then compare the combination of usages attributes with the historic usage attributes to detect the discrepancy, wherein the discrepancy is at least one of: (1) detection of fingerprints not belonging to the user, (2) detection of the speed of inputs different than a historic speed of inputs by a threshold amount, and (3) detection of linguistics different from historic linguistics used by the user when drafting emails.

In some aspects, the continuous authentication module may detect the discrepancy between the usage attributes and the historic usage attributes by determining that a user input received during the access does not match a historic user input received during a previous authenticated access of the service by the user.

In some aspects, each of the plurality of data streams includes timestamp information. Accordingly, the continuous authentication module may detect the discrepancy between the usage attributes and the historic usage attributes by determining (1) that a user input received during the access matches a historic user input received during a previous authenticated access of the service by the user and (2) a timestamp associated with the user input received during the access does not correspond to a historic timestamp associated with the historic user input.

In some aspects, while the service is being accessed, the continuous authentication module may, in response to not detecting the discrepancy, append the usage attributes of the plurality of data streams to the historic usage attributes and may receive an additional plurality of data streams capturing additional usage attributes for comparison with the appended historic usage attributes.

In some aspects, the continuous authentication module may detect the discrepancy using a machine learning algorithm trained to compare the usage attributes with the historic usage attributes.

In another exemplary aspect, a system for continuous user authentication comprises a processor that performs the functions listed above of the continuous authentication module.

In another exemplary aspect, a non-transitory computer readable medium storing thereon computer executable instructions for continuously authenticating a user, comprises instructions for performing the functions listed above of the continuous authentication module.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for continuous user authentication. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

The present disclosure provides the rapid real-time identification of a user by various data streams. The continuous authentication does not replace standard initial authentication, but is intended to check that a person was not changed during the communication session. Based on a coincidence or mismatch of the received data with expected results, it can be concluded that the user is authentic or that he is not who he claims to be. An integrated set of different data sources is utilized to better identify intrusions. For example, even if an attacker can falsify or simulate one parameter, it would be impossible to fake a set of heterogeneous data that can be collected over a sufficiently long period of time.

Figure 1:
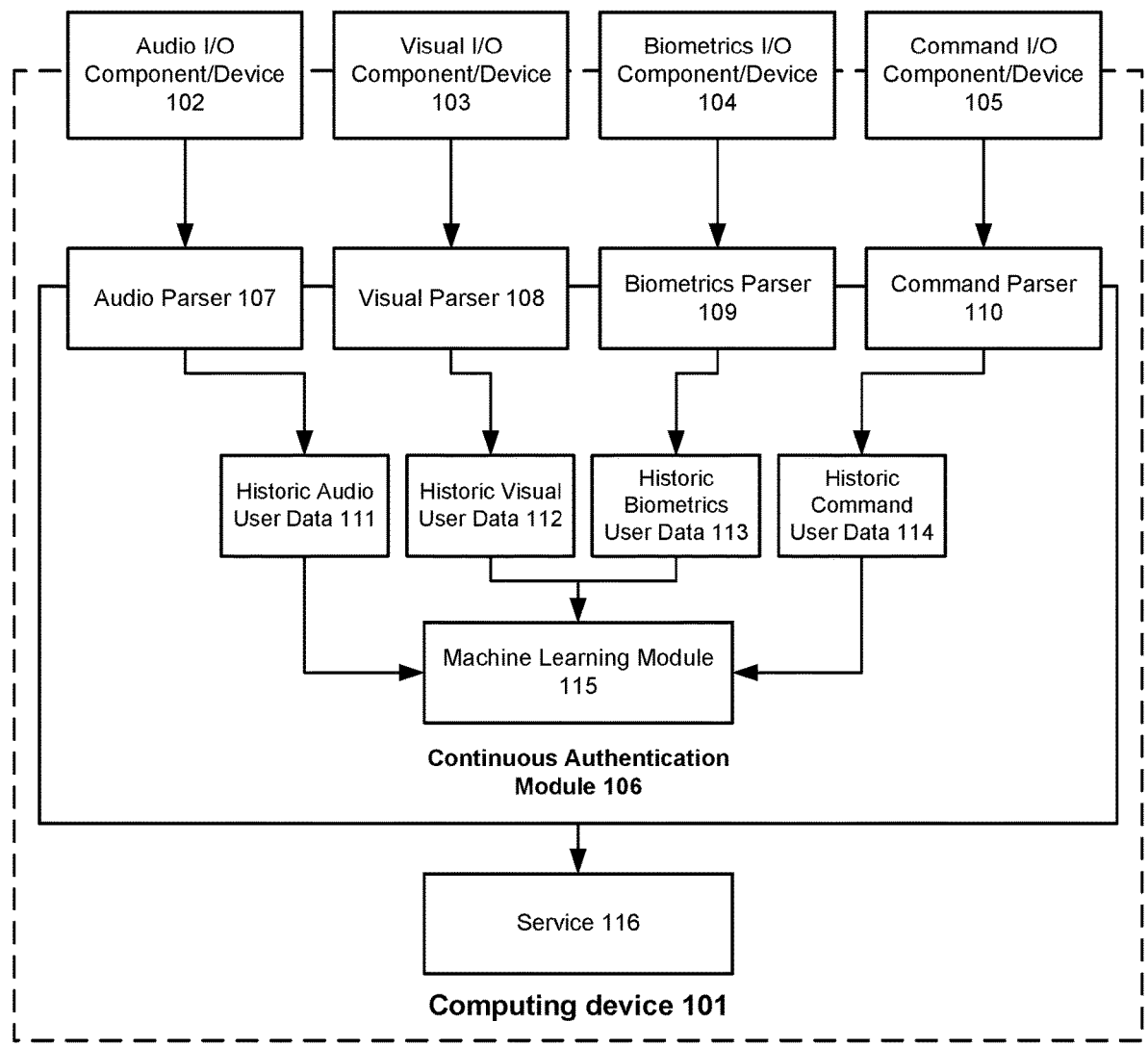
FIG. 1 is a block diagram illustrating a system for continuous user authentication, in accordance with aspects of the present disclosure.
Figure 5:
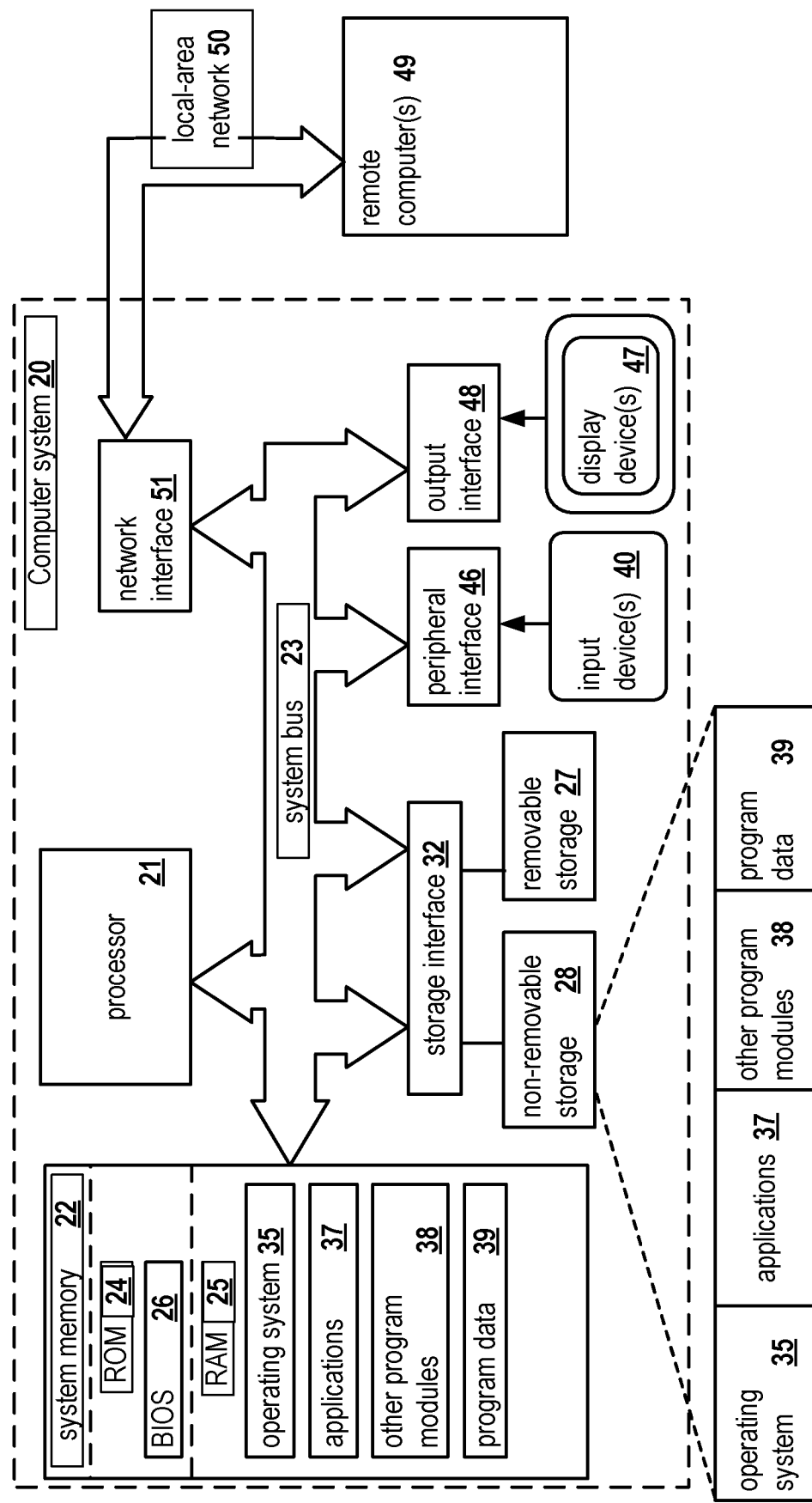
FIG. 5 presents an example of a general-purpose computer system on which aspects of the present disclosure can be implemented.

FIG. 1 is a block diagram illustrating system 100 for continuous user authentication, in accordance with aspects of the present disclosure. System 100 includes computing device 101, which may be an electronic device as shown in FIG. 5 (e.g., a laptop, a smartphone, etc.). Computing device 101 may provide access to a digital service (e.g., service 116), which may be an application, a website, a process, etc. In conventional approaches, a user may provide authentication credentials such as a password and username or a single face/fingerprint scan to gain access to service 116. In the present disclosure, subsequent to receiving these authentication credentials, continuous authentication module 106 verifies the user's identity during the access.

In order to verify the user's identity, continuous authentication module 106 receives a plurality of data streams captured by sensors and/or peripheral devices of computing device 101. Such sensors and peripheral devices may include (1) audio I/O component/device 102, which captures sound and produces an audio data stream (e.g., a continuous audio stream or a plurality of audio clips), (2) visual I/O component/device 103, which captures images and produces a visual data stream (e.g., a video or a plurality of photos), (3) biometrics I/O component device 104, which captures biometric information and translates it into quantitative/qualitative values, and (4) command I/O component/device 105, which captures physical inputs by the user on computing device 101. Suppose that computing device 101 is a laptop. Audio I/O component 102 may be an external or internal microphone, visual I/O component 103 may be a webcam, biometrics I/O component 104 may be a heart rate wrist monitor that wirelessly communicates with computing device 101, and command I/O component 105 may be a touchscreen display and/or a touchscreen.

Each data stream may be associated with a timestamp. For example, if computing device 101 is a laptop, a sample data stream from command I/O component 105 may be a data structure that continuously adds new entries such as {11/11/2019—10:51:01 pm—Pressed "K" key on keyboard}.

It should be noted that the sensors shown in FIG. 1 are just a few of many that can be used in the present disclosure.

Other sensors may include an accelerometer, a global positioning system (GPS), a network sensor, etc. Accordingly the sensors may capture usage attributes that can expose an unauthorized user. For example, the GPS and network sensor may be used to determine the location of the user. If the current user is accessing service 116 in a location that the authorized user has never visited (e.g., a foreign country), continuous authentication module 106 may identify a discrepancy in the behavior of the current user and the authorized user of service 116.

Each sensor and peripheral device depicted in FIG. 1, is accompanied by a parser. The parsers include audio parser 107, visual parser 108, biometrics parser 109, and command parser 110. These parsers receive a data stream as an input and convert the data stream into usage attributes. Usage attributes are parsed data streams that include targeted information. For example, a data stream captured by visual I/O component 103 may be a video feed. Visual parser 108 may extract information about faces and objects from the video feed. Similarly, commands I/O component 105 may simply receive a plurality of physical inputs by the user (e.g., keypresses and associated timestamps). Command parser 110 may determine whether the physical inputs are words, the speed of the inputs, setting changes, etc.

Subsequent to the parsers of continuous authentication module 106 having converted the raw plurality of data streams into parsed information, continuous authentication module 106 may retrieve corresponding historic usage attributes for comparison purposes. Historic usage attributes represent information collected about the authorized user in the context of service 116. Because the information may be captured over a long period of time, it may be extremely difficult for an intruder to fully replicate the behavioral patterns of the authorized user on how he/she interacts with service 116, as captured by historic usage attributes. For example, if the audio parser identifies a voice of a user (e.g., frequency and temporal graphs), continuous authentication module 106 may retrieve historic frequency and temporal graphs to determine whether a match exists. If a match does not exist, continuous authentication module 106 detects a discrepancy. As depicted in FIG. 1, historic usage attributes include historic audio user data 111, historic visual user data 112, historic biometrics user data 113, and historic command user data 114.

Each of the historic usage attributes may be accompanied by historic timestamp information. The purpose of timestamps is to capture when the user performs an action. Although the actions of an unauthorized user and an authorized user may match, exactly when the authorized user performs a certain action may differ. For example, continuous authentication module 106 may determine that a current user accessed a service 116 such as a banking application on computing device 101 (e.g., a smartphone). The current user may access balances and initiate a withdrawal. Although the act of checking a balance and initiating a withdrawal may match the historic usage attributes of service 116 by the authorized user, if the current withdrawal is being performed at 3:00 am and continuous authentication module 106 determines that the authorized user never initiated withdrawals past 5:00 pm, continuous authentication module 106 may detect a discrepancy.

It should be noted that a combination of usage attributes may be needed to confirm a discrepancy. For example, even if the time of access (e.g., 3:00 am) may seem like discrepancy to continuous authentication module 106, additional usage attributes may indicate that the current user is in fact the authorized user. This may be because the fingerprints captured by biometrics I/O component 104 fully match the fingerprints of the authorized user. Continuous authentication module 106 may accordingly assign weights to each type of usage attribute that can be generated by parsers 107-110 and store them in a data structure. For example, the weight of a biometrics usage attribute may be greater than the weight of an input typing speed (e.g., for an email). Continuous authentication module 106 may assign these weights based on exclusivity of the usage attribute. If multiple users can share a particular usage attribute (e.g., typing speed), the weight of the given usage attribute is made lower respective to another usage attribute that is exclusive to the user (e.g., facial images/fingerprints).

When determining whether a discrepancy actually exists, continuous authentication module 106 may add and compare the weights. Suppose that five usage attributes are being considered to determine whether the current user is an authorized user of service 116, namely, fingerprints, facial images, typing speed, motion/gestures captured on video, and linguistics information. The weights for each type of usage attribute may be 0.9, 0.6, 0.1, 0.3, and 0.4. Continuous authentication module 106 may determine that the fingerprints, typing speed, and motions/gestures match the historic fingerprints, typing speed, and motion/gestures of the authorized user, but the remaining usage attributes do not match. Continuous authentication module 106 may determine the sum of the weights for each group (e.g., 1.3 and 1.0, respectively). Because 1.3 is greater than 1.0, continuous authentication module 106 may conclude that a discrepancy does not exist. In some aspects, continuous authentication module 106 may consult with the current user to provide additional details (e.g., a verification code, a security answer, etc.) in response to determining that the difference between the two summed weights is less than a threshold value.

While in some aspects, continuous authentication module 106 may perform a direct comparison of the acquired usage attributes and the historic usage attributes, in other aspects, continuous authentication module 106 may utilize machine learning module 115. Machine learning module 115 may receive a plurality of usage attributes as inputs as well as timestamp information, and output whether the current user is authorized to access service 116, or has been replaced by an unauthorized user. Machine learning module 115 may utilize algorithms such as classification and regression to provide such an output. Machine learning module 115 may also include the weights assigned by continuous authentication module 106 to each usage attribute to make a determination on discrepancies.

Machine learning module 115 may be periodically retrained by continuous authentication module 106 to ensure that newly acquired usage attributes are utilized for future classifications. In some aspects, continuous authentication module 106 may append a recently acquired usage attribute to the historic usage attributes during the access of service 116. In some aspects, continuous authentication module 106 performs the appending after the access has ceased.

In response to detecting a discrepancy, continuous authentication module 106 may cease the access of service 116 by the current user. For example, continuous authentication module 106 may log the current user out of service 116. If service 116 is a website or application, continuous authentication module 106 may also close the website and application, respectively. In some aspects, continuous authentication module 106 may alert (e.g., via email or text) the authorized user about the detected discrepancy. The authorized user may confirm whether continuous authentication module 106 correctly or incorrectly made the determination on discrepancy. Based on the authorize user's feedback, continuous authentication module 106 may retrain machine learning module 115, adjust the weights assigned to the respective usage attributes, and/or append the acquired usage attributes to the historic usage attributes (if the current user is the authorized user).

Figure 2:
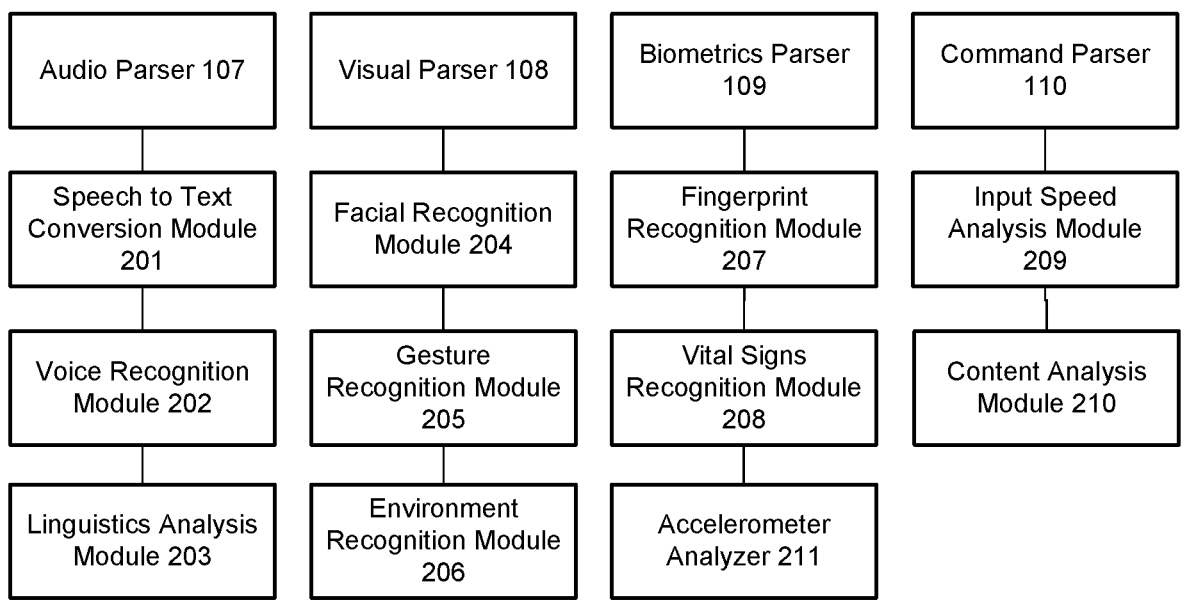
FIG. 2 is a block diagram illustrating additional modules comprised in the parsers used for continuous user authentication, in accordance with aspects of the present disclosure.

FIG. 2 is a block diagram 200 illustrating additional modules comprised in the parsers used for continuous user authentication, in accordance with aspects of the present disclosure. FIG. 2 presents modules that may be included in the parsers described in FIG. 1. For example, audio parser 107 may include speech to text conversion module 201 for acquiring words stated by the current user, voice recognition module 202 for determining a name of the current user based on a detected voice, and linguistics analysis module 203 for identifying verbal tendencies of the current user and word usage. Visual parser 108 may include facial recognition module 204 for identifying faces in an image and identifying names associated with the faces, gesture recognition module 205 for identifying motions and gestures in a video feed, and environment recognition module 206 for determining the surroundings of the current user in an image. Biometrics parser 109 may include fingerprint recognition module 207 for identifying fingerprints and determining any associated individuals with matching fingerprints, vital signs recognition module 208 for extracting information such as blood pressure, heart rate, pulse, etc., and accelerometer analyzer 211 to determine speed and movements that may or may not be captured by a visual feed. Lastly, command parser 110 may include an input speed analysis module 209 that determines the speed at which the current user is providing inputs, and content analysis module 210 that determines what the current user is accessing (also used to determine user options). The parsers and the modules comprised in the parsers are not limited to the functionality described herein. These are merely examples of parsers that continuous authentication module 106 may utilize.

Figure 3:
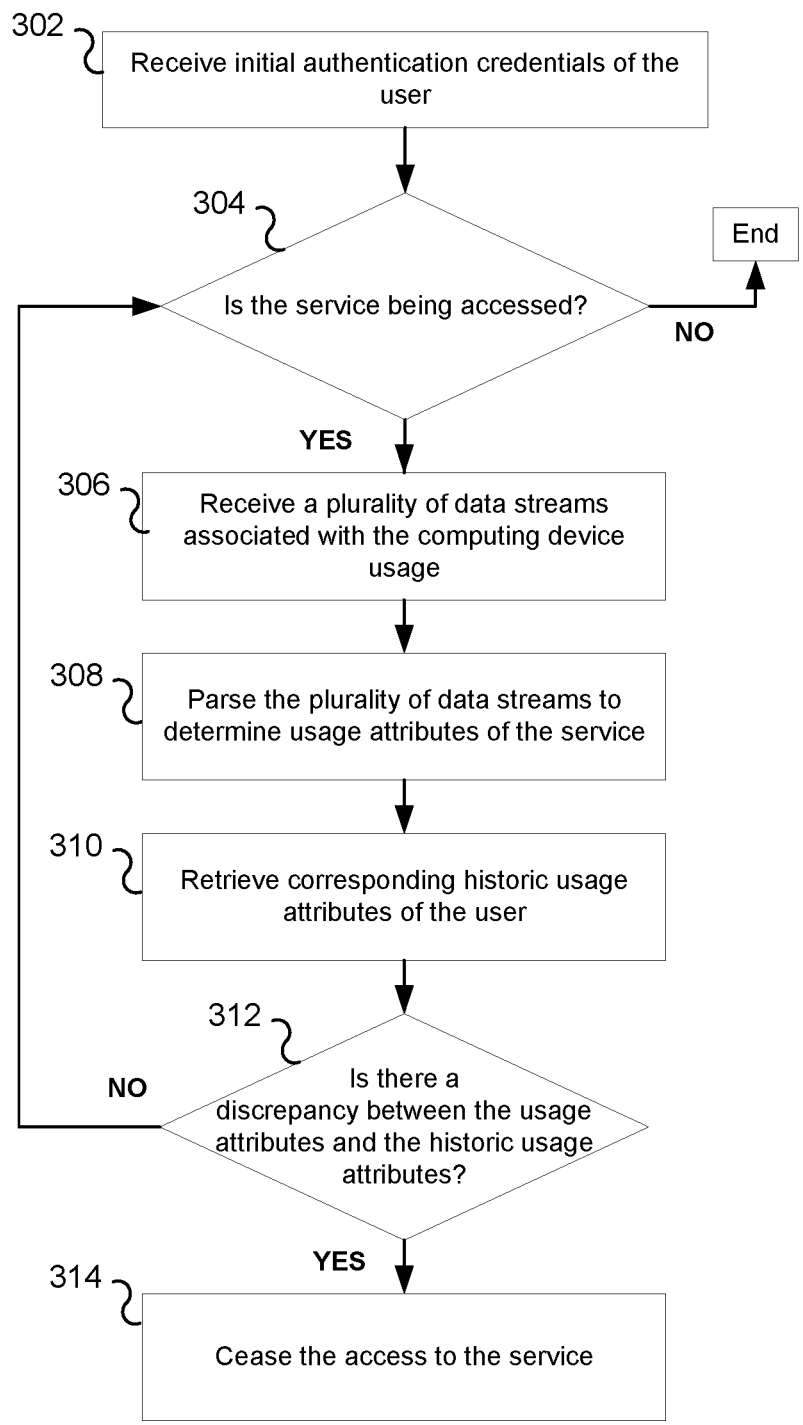
FIG. 3 illustrates a flow diagram of a method for continuous user authentication, in accordance with aspects of the present disclosure.

FIG. 3 illustrates a flow diagram of method 300 for continuous user authentication, in accordance with aspects of the present disclosure. Suppose that an intruder is attempting to gain access to a user's email inbox. At 302, continuous authentication module 106 receives initial authentication credentials of the user (e.g., a password and username, a facial scan, a fingerprint, etc.). The initial authentication credentials are used to gain access to the email service. At 304, continuous authentication module 106 determines whether the service is being accessed. For example, continuous authentication module 106 may determine whether an application or website associated with the service is actually being used. If the service is not being accessed, method 300 ends.

Otherwise, method 300 proceeds to 306, where continuous authentication module 106 receives a plurality of data streams associated with the computing device usage. Referring to FIG. 1, computing device 101 may be connected to or may include various I/O components that serves as the origin of the plurality of data streams. For example, as previously discussed, one of the plurality of data streams may be a biometrics data stream received from biometrics I/O component 104 (e.g., fingerprints on a touchscreen display of computing device 101. Another of the plurality of data streams may be a command data stream received from command I/O component 105. The command data stream may include information about what the user is typing and when.

At 308, continuous authentication module 106 parses the plurality of data streams to determine usage attributes of the service. For example, continuous authentication module 106 may forward the raw data streams received from biometrics I/O component 104 and from command I/O component 105 to biometrics parser 109 and command parser 110. As depicted in FIG. 2, biometrics parser 109 and command parser 110 may be composed of multiple modules such as fingerprint recognition module 207, vital signs recognition module 208, input speed analysis module 209, and content analysis module 210. Continuous authentication module 106 may identify which individual usage attributes are needed to increase the likelihood of finding a discrepancy and reduce false positives. Utilizing all parsers to come up with all possible usage attributes may be superfluous because certain usage attributes may be unnecessary for particular services. As an example, vital signs recognition module 208 may be unnecessary because the user's heart rate is not expected to drastically change when drafting an email. A usage attribute such as heart rate may be more appropriate if the service is a fitness tracker application in which the user's biological response to exercise may be monitored. In fact, using the user's heart rate as a usage attribute when monitoring an email service may create false positives in the event that the actual user is accessing email. The actual user may experience a sporadic increase in heart rate and get locked out from the email service because of a forced logout.

In this example, continuous authentication module 106 may determine that fingerprint recognition module 207, input speed analysis module 209, and content analysis module 210, are the parsers to employ in order to get the usage attributes with the highest likelihood of successfully identifying a discrepancy (higher than other combinations of usage attributes). Accordingly, continuous authentication module 106 may continuously acquire and parse data streams from biometrics I/O component 104 and command I/O component 105 to get fingerprint information, speed of typing, and textual input information.

At 310, continuous authentication module 106 retrieves corresponding historic usage attributes of the user (e.g., historic fingerprint information, historic speed of typing, and historic textual input information). At 312, continuous authentication module 106 determines whether there is a discrepancy between the usage attributes and the historic usage attributes. In some aspects, continuous authentication module 106 may utilize machine learning module 115 to compare the acquired usage attributes with historic usage attributes. For example, machine learning module 115 may be trained based on the historic usage attributes to classify whether a current user's appearance and/or behavior matches an authorized user's appearance and behavior (as indicated by the historic usage attributes).

Suppose that continuous authentication module 106 detects that the fingerprints of the user, as received using typing, do not correspond with fingerprints of an authorized user. Alternatively or additionally, continuous authentication module 106 may determine that a speed of typing (e.g., 100 words per minute) is greater than a historic speed of typing (e.g., 60 words per minute) for the user. In some cases, continuous authentication module 106 may determine that the linguistics of the text entered into an email draft by the current user does not match historic linguistics (e.g., the text is in a different language, or the phrases used by the current user do not match what the phrases that the authorized user historically used. Any combination of the mismatches described can be considered a discrepancy by continuous authentication module 106.

In response to detecting a discrepancy, at 314, continuous authentication module 106 ceases the access to the service (e.g., logs out the current user and prevents him/her from further access to the service). In some aspects, continuous authentication module 106 may store the usage attributes associated with the discrepancy. Subsequent to ceasing the access, if another attempt is made to access the service and such an attempt matches the usage attributes associated with the discrepancy, the unauthorized user is immediately blocked. This is a targeted way of preventing access to the service by particular intruders (where continuous authentication module 106 knows exactly which usage attributes are of an unauthorized user).

As these steps described above are continuous, if a discrepancy is not detected during a particular time interval or increment of comparison, method 300 returns to 304 where continuous authentication module 106 determines again whether the service is being accessed.

Figure 4:
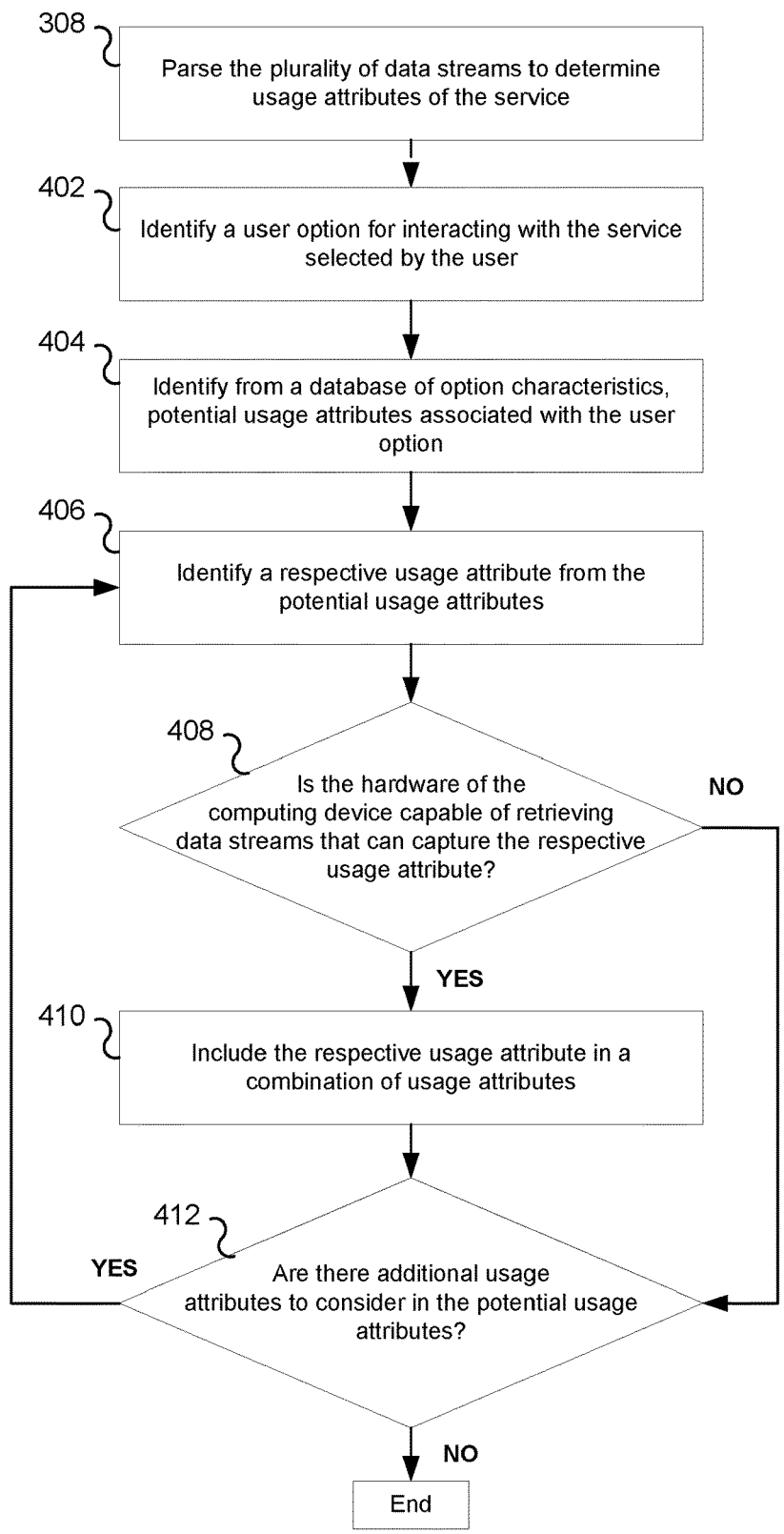
FIG. 4 illustrates a flow diagram of a method for determining a combination of usage attributes, in accordance with aspects of the present disclosure.

FIG. 4 illustrates a flow diagram of method 400 for determining a combination of usage attributes, in accordance with aspects of the present disclosure. Method 400 expands on 308 of method 300. At 402, continuous authentication module 106 identifies a user option for interacting with the service selected by the user. In particular, continuous authentication module 106 may monitor and classify the activity that the user is performing on the service. For example, for an email service, user options (i.e., the options of activities the user can potentially partake in) may include drafting an email, reading emails in the inbox, filtering/organizing emails, adjusting mail settings, etc. Suppose that continuous authentication module 106 detects that the user is drafting an email.

At 404, continuous authentication module 106 identifies, from a database of option characteristics, potential usage attributes associated with the user option. The database of option characteristics maps respective user options for a particular service with potential usage attributes. For example, drafting emails may be associated with input speed of typing, linguistics of typed text, email recipient identifiers, fingerprints of the typist, and a facial recognition of the typist. In contrast, reading emails may only be associated with facial recognition of the typist and selection of emails. To reduce processing requirements, rather than tracking all of the usage attributes associated with the service, continuous authentication module 106 may identify usage attributes associated with a selected user option.

At 406, continuous authentication module 106 identifies a respective usage attribute from the potential usage attributes (e.g., facial recognition). At 408, continuous authentication module 106 determines whether the hardware of computing device 101 is capable of retrieving data streams that can capture the respective usage attribute. For example, facial recognition module 204 may provide facial information of the current user (e.g., provide the name associated with a face identified in a visual feed). However, suppose that computing device 101 does not have a camera and is not connected to a camera. Thus, computing device 101 is unable to acquire visual data streams. Because the hardware of computing device 101 is not capable of producing facial recognition information, method 400 advances to 412, where continuous authentication module 106 determines whether there are additional usage attributes to consider in the potential usage attributes.

In the overarching example of drafting emails, because there are other potential usage attributes to consider, method 400 returns to 406. In this iteration, continuous authentication module 106 may select input speed of typing. At 408, continuous authentication module 106 may determine that the hardware is capable of determining the input speed of typing and method 400 accordingly proceeds to 410. At 410, continuous authentication module 106 includes the respective usage attribute in a combination of usage attributes (e.g., begins tracking input speed of typing). Method 400 may loop between 406 and 412 until all potential usage attributes associated with the user option of drafting emails has been considered.

It should be noted that the user may begin partaking in a different user option during the access of the service. For example, the user may start to change mail settings after sending a drafted email. Because the combination of usage attributes tracked for drafting an email may be different from changing settings, continuous authentication module 106 may determine a new combination of usage attributes to track. Furthermore, depending on which hardware components provide certain usage attributes, continuous authentication module 106 may activate/deactivate certain components. For example, the user's fingerprints may not be needed, according to the database of options characteristics, when the user is changing the mail settings. Accordingly, continuous authentication module 106 may deactivate biometrics I/O component 104 to reduce processing, power, and memory usage on computing device 101. Should the user begin typing a new email, continuous authentication module 106 may reactivate biometrics I/O component 104 to begin tracking fingerprints again.

FIG. 5 is a block diagram illustrating a computer system 20 on which aspects of systems and methods for continuous user authentication may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-4 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for continuously authenticating a user, the method comprising:
   receiving, at a computing device, initial authentication credentials of the user, the initial authentication credentials enabling access to a service via the computing device;
   while the service is being accessed, continuously determining whether an unauthorized user has replaced the user in accessing the service by:
   identifying a user option selected for interacting with the service;
   selecting, based on a type of the user option, a first set of usage attributes that can be used to monitor the user option, wherein the first set of usage attributes is selected for user options of a first type and a second set of usage attributes is selected for user options of a second type;
   receiving a plurality of data streams capturing the first set of usage attributes of the service, wherein each data stream of the plurality of data streams is of a different data type;
   comparing the first set of usage attributes with historic usage attributes associated with the user; and
   applying a respective weight to each respective usage attribute of the first set of usage attributes based on an exclusivity of the respective usage attribute to the user, wherein a first usage attribute is weighted higher than a second usage attribute for representing data unique to the user;
   detecting that a discrepancy between the first set of usage attributes and the historic usage attributes exists based on determining that a first combined value of each respective weight for usage attributes that do not match between the first set of usage attributes and the historic usage attributes exceeds a second combined value of each respective weight for usage attributes that do match, wherein the discrepancy indicates that an unauthorized user has replaced the user; and
   determining that the unauthorized user has replaced the user and ceasing the access to the service via the computing device.

2. The method of claim 1, where the plurality of data streams comprises at least two of: an audio data stream, a visual data stream, a biometrics data stream, and an input/output (I/O) command data stream.

3. The method of claim 1, further comprising:
   identifying all possible usage attributes that can be extracted from the plurality of data streams;
   determining, based on the service and the user option, the first set of usage attributes from the plurality of data streams that increase a likelihood of detecting the discrepancy without false positives; and
   parsing each of the plurality of data streams to extract the first set of usage attributes.

4. The method of claim 3, wherein determining the first set of usage attributes further comprises:
   identifying, from a database of option characteristics, the first set of usage attributes that can be used to monitor the user option based on hardware capabilities of the computing device.

5. The method of claim 4, further comprising adjusting the first set of usage attributes to include and remove select usage attributes in response to detecting a selection of a different user option.

6. The method of claim 4, wherein the service is an email application, and wherein the user option is drafting an email, further comprising:
   detecting that the user option of drafting the email is being utilized;
   determining, based on the database of option characteristics, that the first set of usage attributes comprises: (1) user fingerprints during typing, (2) speed of inputs, and (3) linguistics of text in the email; and
   comparing the first set of usage attributes with the historic usage attributes to detect the discrepancy, wherein the discrepancy comprises: (1) detection of fingerprints not belonging to the user, (2) detection of the speed of inputs different than a historic speed of inputs by a threshold amount, and (3) detection of linguistics different from historic linguistics used by the user when drafting emails.

7. The method of claim 1, wherein detecting the discrepancy between the first set of usage attributes and the historic usage attributes comprises determining that a user input received during the access does not match a historic user input received during a previous authenticated access of the service by the user.

8. The method of claim 1, wherein each of the plurality of data streams includes timestamp information, and wherein detecting the discrepancy between the first set of usage attributes and the historic usage attributes comprises:
   determining (1) that a user input received during the access matches a historic user input received during a previous authenticated access of the service by the user and (2) a timestamp associated with the user input received during the access does not correspond to a historic timestamp associated with the historic user input.

9. The method of claim 1, wherein the discrepancy is detected using a machine learning algorithm trained to compare usage attributes with the historic usage attributes.

10. A system for continuously authenticating a user, the system comprising:
    a hardware processor configured to:
    receive, at a computing device, initial authentication credentials of the user, the initial authentication credentials enabling access to a service via the computing device;
    while the service is being accessed, continuously determine whether an unauthorized user has replaced the user in accessing the service by:
    identify a user option selected for interacting with the service;
    select, based on a type of the user option, a first set of usage attributes that can be used to monitor the user option, wherein the first set of usage attributes is selected for user options of a first type and a second set of usage attributes is selected for user options of a second type;

receive a plurality of data streams capturing usage attributes of the service, wherein each data stream of the plurality of data streams is of a different data type;

compare the first set of usage attributes with historic usage attributes associated with the user; and apply a respective weight to each respective usage attribute of the first set of usage attributes based on an exclusivity of the respective usage attribute to the user, wherein a first usage attribute is weighted higher than a second usage attribute for representing data unique to the user;

detect that a discrepancy between the first set of usage attributes and the historic usage attributes exists based on determining that a first combined value of each respective weight for usage attributes that do not match between the first set of usage attributes and the historic usage attributes exceeds a second combined value of each respective weight for usage attributes that do match, wherein the discrepancy indicates that an unauthorized user has replaced the user; and determine that the unauthorized user has replaced the user and cease the access to the service via the computing device.

11. The system of claim 10, where the plurality of data streams comprises at least two of: an audio data stream, a visual data stream, a biometrics data stream, and an input/output (I/O) command data stream.

12. The system of claim 10, wherein the hardware processor is further configured to:

identify all possible usage attributes that can be extracted from the plurality of data streams;

determine, based on the service and the user option, the first set of usage attributes from the plurality of data streams that increase a likelihood of detecting the discrepancy without false positives; and parse each of the plurality of data streams to extract the first set of usage attributes.

13. The system of claim 12, wherein the hardware processor is further configured to determine the first set of usage attributes by:

identifying, from a database of option characteristics, the first set of usage attributes that can be used to monitor the user option based on hardware capabilities of the computing device.

14. The system of claim 13, wherein the hardware processor is further configured to adjust the first set of usage attributes to include and remove select usage attributes in response to detecting a selection of a different user option.

15. The system of claim 13, wherein the service is an email application, and wherein the user option is drafting an email, and wherein the hardware processor is further configured to:

detect that the user option of drafting the email is being utilized;

determine, based on the database of option characteristics, that the first set of usage attributes comprises: (1) user fingerprints during typing, (2) speed of inputs, and (3) linguistics of text in the email; and compare the first set of usage attributes with the historic usage attributes to detect the discrepancy, wherein the discrepancy comprises: (1) detection of fingerprints not belonging to the user, (2) detection of the speed of inputs different than a historic speed of inputs by a threshold amount, and (3) detection of linguistics different from historic linguistics used by the user when drafting emails.

16. The system of claim 10, wherein the hardware processor is configured to detect the discrepancy between the first set of usage attributes and the historic usage attributes comprises determining that a user input received during the access does not match a historic user input received during a previous authenticated access of the service by the user.

17. The system of claim 10, wherein each of the plurality of data streams includes timestamp information, and wherein the hardware processor is configured to detect the discrepancy between the first set of usage attributes and the historic usage attributes by:

determining (1) that a user input received during the access matches a historic user input received during a previous authenticated access of the service by the user and (2) a timestamp associated with the user input received during the access does not correspond to a historic timestamp associated with the historic user input.

18. A non-transitory computer readable medium storing thereon computer executable instructions for continuously authenticating a user, comprising instructions for:

receiving, at a computing device, initial authentication credentials of the user, the initial authentication credentials enabling access to a service via the computing device;

while the service is being accessed, continuously determining whether an unauthorized user has replaced the user in accessing the service by:

identifying a user option selected for interacting with the service;

selecting, based on a type of the user option, a first set of usage attributes that can be used to monitor the user option, wherein the first set of usage attributes is selected for user options of a first type and a second set of usage attributes is selected for user options of a second type;

receiving a plurality of data streams capturing usage attributes of the service, wherein each data stream of the plurality of data streams is of a different data type;

comparing the first set of usage attributes with historic usage attributes associated with the user; and applying a respective weight to each respective usage attribute of the first set of usage attributes based on an exclusivity of the respective usage attribute to the user, wherein a first usage attribute is weighted higher than a second usage attribute for representing data unique to the user;

detecting that a discrepancy between the first set of usage attributes and the historic usage attributes exists based on determining that a first combined value of each respective weight for usage attributes that do not match between the first set of usage attributes and the historic usage attributes exceeds a second combined value of each respective weight for usage attributes that do match, wherein the discrepancy indicates that an unauthorized user has replaced the user; and determining that the unauthorized user has replaced the user and ceasing the access to the service via the computing device.

* * * * *